United States Patent [19]

Falamak

[11] Patent Number: 4,533,998
[45] Date of Patent: Aug. 6, 1985

[54] CONTROL APPARATUS FOR OMNIDIRECTIONAL, POLAR COORDINATED PLATFORM FOR LAWNMOWER AND THE LIKE

[76] Inventor: Reza Falamak, P.O. Box 770188, Houston, Tex. 77215

[21] Appl. No.: 628,337

[22] Filed: Jul. 6, 1984

Related U.S. Application Data

[63] Continuation of Ser. No. 353,250, Mar. 1, 1982, Pat. No. 4,463,821.

[51] Int. Cl.³ .......................... G06F 15/50; B62D 1/28
[52] U.S. Cl. ....................................... 364/424; 377/17; 340/991; 180/168
[58] Field of Search ............... 364/424, 444, 449, 457; 340/988, 991, 992, 993; 343/450, 451; 73/178 R; 180/23, 24, 79.1, 167, 168, 234, 241, 251; 280/47.11; 377/17

[56] References Cited

U.S. PATENT DOCUMENTS

| 2,698,507 | 1/1955 | Siebring | 180/2 R |
|---|---|---|---|
| 2,994,392 | 8/1961 | Kosman | 180/6.24 |
| 3,061,035 | 10/1962 | King | 180/79.1 |
| 3,090,516 | 5/1963 | Seymour et al. | 280/47.11 |
| 3,134,455 | 5/1964 | Florentini | 180/140 |
| 3,305,116 | 2/1967 | McKee | 414/459 |
| 3,306,390 | 2/1967 | Jamme | 180/209 |
| 3,472,322 | 2/1967 | Barry | 172/26 |
| 3,550,714 | 12/1970 | Bellinger | 180/79.1 |
| 3,570,227 | 3/1971 | Bellinger | 56/10.2 |
| 3,570,615 | 3/1971 | Guilbaud et al. | 180/79.1 |
| 3,572,458 | 3/1971 | Tax | 180/79.1 |
| 3,669,466 | 6/1972 | Spence | 280/91 |
| 3,680,653 | 4/1972 | Murata et al. | 180/23 |
| 3,800,902 | 4/1974 | Keller | 180/167 |
| 3,984,806 | 10/1976 | Tyler | 340/988 |
| 4,215,759 | 8/1980 | Diaz | 180/168 |
| 4,238,829 | 12/1980 | Martin | 377/17 |
| 4,274,503 | 6/1981 | Mackintosh | 180/23 |
| 4,454,583 | 6/1984 | Schneiderhan et al. | 364/449 |
| 4,463,821 | 8/1984 | Falamak | 180/168 |

Primary Examiner—Gary Chin
Attorney, Agent, or Firm—Arnold, White & Durkee

[57] ABSTRACT

Control apparatus for an omnidirectional, polar coordinated platform for a lawnmower and the like is disclosed in which a line selector has at least one steering command line coupled to an angle selector, and at least one driving command line coupled to a moving selector. The angle selector produces a steering angle signal which is combined with a compass signal in an angle comparator to produce a steering signal, which is received by a steering counter that selectively activates a steering device. The moving selector produces a drive signal which is received by a driving comparator that selectively activates a driving device.

20 Claims, 7 Drawing Figures

Fig. 4

CONTROL APPARATUS FOR OMNIDIRECTIONAL, POLAR COORDINATED PLATFORM FOR LAWNMOWER AND THE LIKE

CROSS-REFERENCE TO RELATED APPLICATIONS

This patent application is a continuation of my earlier application, Ser. No. 353,250, filed on Mar. 1, 1982, for Drivable, Steerable Platform for Lawnmower and the Like, now U.S. Pat. No. 4,463,821.

BACKGROUND OF THE INVENTION

This invention relates generally to steerable vehicles, and more particularly to a drivable, steerable platform.

Drivable, steerable platforms have been used in industrial and agricultural equipment. Known prior art devices utilize complex mechanical linkages to effectuate steering. The mechanical steering linkages are actuated by hydraulic cylinders driven by a selectively actuated hydraulic pump. The wheels can typically be steered through angles greater than 180°. Due to mechanical limitations of the linkage system, however, the wheels cannot be steered through an angle of 360°.

Typically, such platforms receive their driving power from an internal combustion engine or an electric motor driven by a battery. The engine or motor drives a hydraulic pump which delivers fluid under pressure to hydraulic motors attached to each wheel of the platform. The hydraulic motors that drive the wheels must be carefully regulated for the wheels to each turn at the same speed.

Other known prior art devices include cable steering systems. Such devices include a plurality of spools on which cable is wound and unwound to effectuate steering. In such systems, the wheels of the vehicle cannot be steered through an angle of 360°.

Yet other known prior art devices include wheels powered by an engine through a transmission, pulleys, belts, shafting and gearing assemblies. Sprockets and gear chains may be included to effectuate steering. Hydrauic pumping devices may be used, and the wheels are typically permitted to turn through about 180°.

The control apparatus of known prior art devices permits only limited control of vehicle steering and driving. One known prior art remote control lawnmower can be steered only through relatively large angular turns. Another known prior art lawnmower operates only on the principle of random motion within a boundary.

The known prior art devices offer complex mechanical and/or hydraulic construction and relatively poor control over device steering and driving.

SUMMARY OF THE INVENTION

According to the present invention, a drivable, steerable platform is provided which can be accurately controlled. The platform may be guided in any direction by manual control, remote control, and cassette and computer program control, without a steering wheel. Control structure is provided to permit angular movement in any direction as fine as 0.1°, and straight line movement as fine as a fraction of an inch. The platform has a minimum turning radius of zero.

In one embodiment, a drivable, steerable platform includes a frame member, and 3+N wheel assemblies, N=0, 1, 2, .... The frame member is generally disposed in a frame member plane oriented substantially parallel to the surface upon which the platform is to move.

Each wheel assembly includes support structure rotatably connected to the frame member. The support structure is permitted to rotate about an axis substantially perpendicular to the frame member plane.

A wheel member is rotatably mounted on the support structure. The wheel member is permitted to rotate in a wheel rotation plane about an axis substantially parallel to the frame member plane. The wheel rotation planes of the 3+N wheel members are substantially parallel to each other and are all substantially perpendicular to the frame member plane.

Each wheel assembly further includes a first drive structure to drive the wheel member about its axis of rotation. A first steering structure is also provided to rotate the support structure about its axis of rotation. The steering structure permits rotation of the support structure and hence the wheel member through 360°.

A first endless device is provided and connected to each of the first drive structures to rotate each of the 3+N wheel members substantially in synchronism. A second endless device is also provided and connected to each of the first steering structure to rotate each of the 3+N support structures substantially in sychronism.

Structure is provided for selectively driving the first and second endless devices. The drive structure includes a driving device, and first and second clutch structures to selectively connect the driving device to the first and second endless devices, respectively.

According to another aspect of the invention, means are included for activating the drive structure. Relay structures are provided to selectively actuate the first and second clutch structures. A control circuit is provided for selectively operating each of the relay structures.

In accordance with another aspect of the present invention, a receiver is included. The receiver receives broadcasted signals from a remote control point. The received signals are processed to provide control signals for the control circuit. A transmitter may be included for broadcasting signals back to the remote control point.

According to another aspect of the invention, the platform is fixedly connected to a housing structure which accommodates a lawnmower blade. The blade is disposed substantially parallel to the frame member plane, and is driven by the driving device.

BRIEF DESCRIPTION OF THE DRAWINGS

The invention will further be described by reference to the accompanying drawings which illustrate the particular embodiments of a drivable, steerable platform in accordance with the present invention, wherein like members bear like reference numerals and wherein.

DESCRIPTION OF THE PREFERRED EMBODIMENTS

Figure 1:
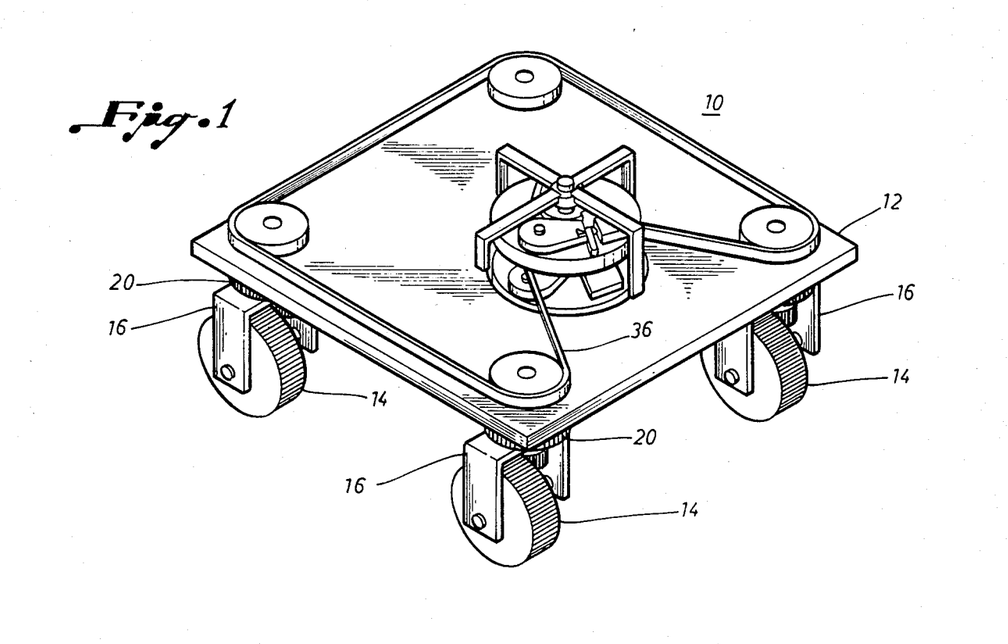
FIG. 1 is a perspective view of one embodiment of a drivable, steerable platform according to the present invention.

Referring now to the drawings, and in particular to FIG. 1, there is shown in perspective view a drivable, steerable platform 10 having a frame member 12 generally disposed in a frame member plane. The platform 10 includes four identical wheel assemblies 14, each of which are illustrated in greater detail in FIG. 2. Each wheel assembly includes a first support structure 16 rotatably connected to the frame member 12. The structure 16 includes a fork 18 fixedly connected to a gear 20. The gear 20 is free to rotate on a shaft 22 which is rotatably mounted on the fram member 12 by a bearing assembly 24. Angular movement of the gear 20 about the axis of shaft 22 produces a similar angular rotation of the fork 18 about the same axis.

Figure 2:
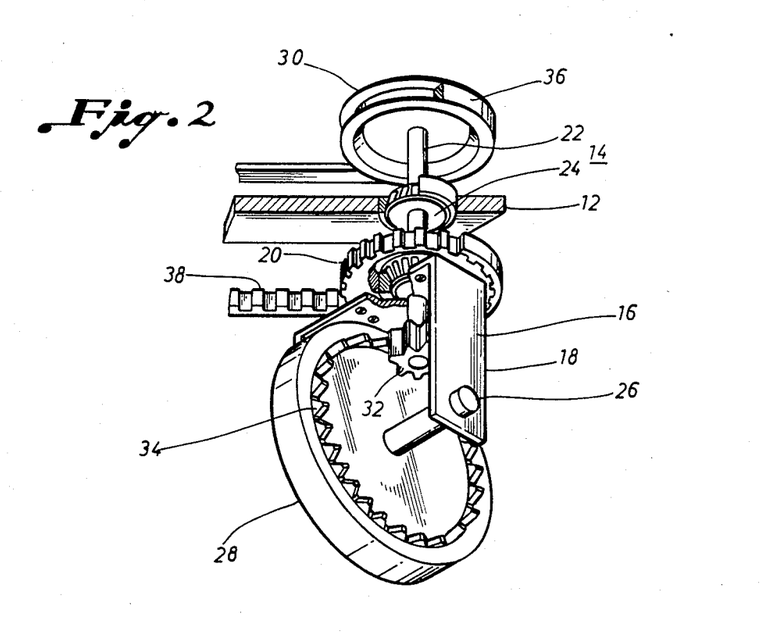
FIG. 2 is a perspective view of the wheel assembly employed in the platform of FIG. 1.
Figure 2A:
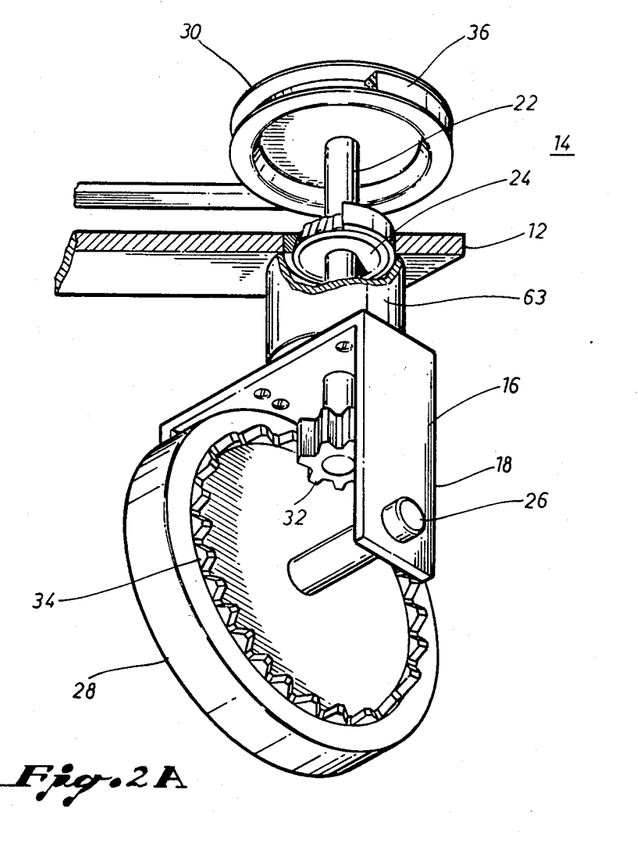
FIG. 2A is a perspective view of an alternate wheel assembly.

Support structure 16 further includes an axle 26 mounted in the fork 18. The axis of axle 26 is disposed substantially parallel to the frame member plane. Wheel member 28 is mounted on the axle 26. The wheel member 28 rotates about the axis of axle 26 in a wheel rotation plane substantially perpendicular to the frame member plane.

A pulley 30 is mounted on the shaft 22, as is a gear member 32. The gear member 32 meshes with a gear portion 34 of the wheel member 28. Rotation of the pulley 30 causes rotation of the gear 32, which in turn drives the gear portion 34, rotating the wheel member 28 about the axis of the axle 26.

Figure 3:
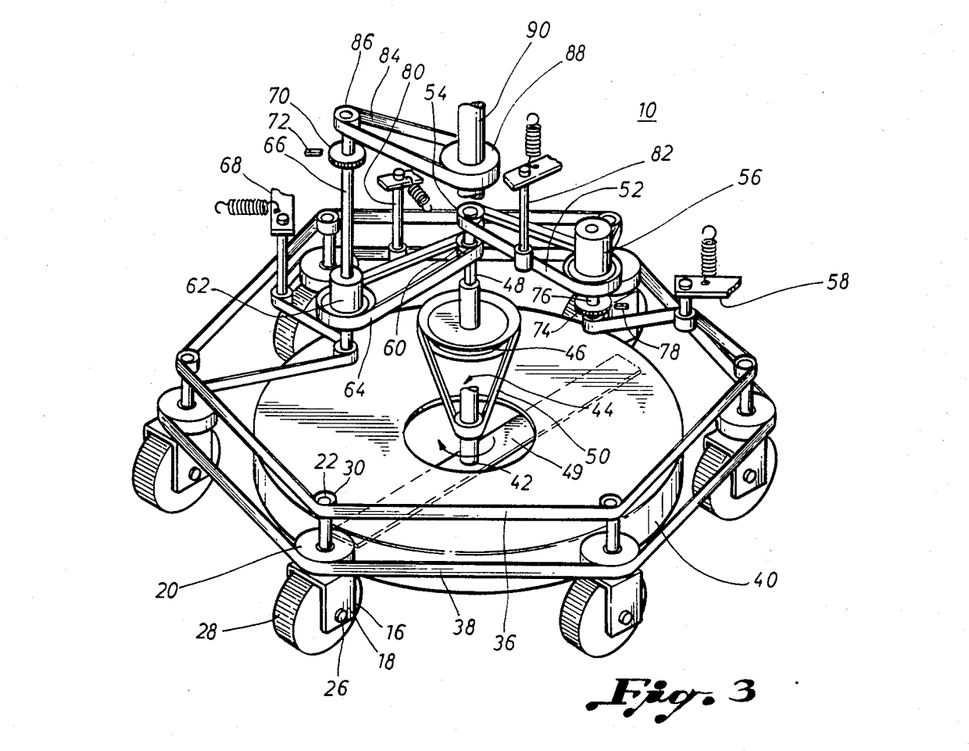
FIG. 3 is a perspective view of another embodiment of a drivable, steerable platform according to the present invention, having a lawnmower housing accommodating a lawnmower blade.

In the embodiment illustrated in FIGS. 1, 2 and 3, the pulley 30 is driven by a first endless drive belt 36 disposed on one side of the frame member 12. The gear 20 is driven by a second endless drive belt 38 disposed on the other side of the frame member 12. Alternately, the drive belts 36 and 38 may both be disposed on the same side of the frame member 12.

Preferably, the drive belts 36 and 38 are each gear-type endless belts which suitably mate with gear portions included on the pulley 30 and the gear 20. The drive belts 36 and 38, however, may be of any suitable construction, such as "V" belts, chains, and so forth, and the structure of the pulley 30 and the gear 20 altered accordingly.

In the embodiment illustrated in FIG. 3, the endless drive belts 36 and 38 are disposed on opposite sides of the frame member (not illustrated). Six identical wheel assemblies are provided in this embodiment, each wheel assembly being disposed at one of the vertices of a regular hexagon.

A housing 40 is movingly connected to the frame member (not illustrated). A lawnmower blade (not illustrated) is accommodated in the housing 40 and mounted on a shaft 42. A motor or engine (not illustrated) is suitably mounted on the housing 40 and directly connected to end 44 of the shaft 42. The motor causes the shaft 42 to rotate in only one direction as indicated by the arrow in FIG. 3.

A pulley 46 is rotatably mounted on the housing 40 and connected by a belt 50 to the shaft 42. The pulley 46 slidingly accommodates a square shaft 48. The shaft 48 is journalled at one end to the frame member (not illustrated), and is free at the other end to move through the pulley 46.

The pulley 46 and the housing 40 may be moved up and down along the shaft 48 to adjust the height of the lawnmower blade 49. The motor moves up and down with the housing 40 and the pulley 46. The square shaft 48 accommodated by the pulley 46 effectively couples the motor to the platform structure which is to be driven at each lawnmower height setting.

Driving and steering power is provided to the wheel assemblies 14 from the motor through the shaft 48. A belt 52 connects a pulley 54 mounted on the shaft 48 to a driving clutch 56. The clutch is operated by a relay structure (not illustrated). When the relay is operated to actuate the driving clutch, the belt 36 is made to move thereby driving each wheel member 28 substantially in synchronism.

Any slack which may exist in the belt 36 is taken up by belt tension structure 58. The structure includes a spring-loaded tension roller which applies tension to the belt. Impulses tending to be imparted to the belt 36, such as by actuating the driving clutch 56, are absorbed by the spring member of the belt tension structure 58.

A pulley 60, mounted on the shaft 48, is coupled to a steering clutch and brake 62 by a belt 64. The steering clutch and brake 62 is actuated by a second relay structure (not illustrated). When actuated, the clutch mechanism of steering clutch and brake 62 imparts rotative motion from the motor to a shaft 66. The shaft 66 in turn drives the belt 38. When the brake mechanism of the steering clutch and brake 62 is actuated, the shaft 66 is locked in position, thereby locking the belt 36 and gears 20 and forks 18 in position. Belt tension structure 68 is included to take up any slack of belt 38. Belt tension structures 58 and 68 function identically.

In the embodiment illustrated in FIG. 1, the driving clutch 56 and the steering clutch and brake 62 are both mounted on the shaft 42 driven by the motor. In an alternate embodiment (not illustrated), either one or both of the driving clutch 56 and the steering clutch and brake 62 are replaced by d.c. motors. The unnecessary belts, pulleys, and so forth are eliminated.

In other alternate embodiments, the steering clutch and brake 62 is replaced by a suitable electric braking device 63 which operates either on the shaft 66, or the shaft 22 (see FIG. 24) of one or more of the wheel assemblies 14. In operation, when the driving clutch 56 is actuated and the braking device 63 is not, the first support structures 16 of the wheel assemblies 14 rotate about the axis of the shaft 22, thereby effectuating steering. The driving clutch is actuated for a predetermined period of time to steer the first support structures 16 through a predetermined angle. When the braking device 63 is actuated, the first support structures 16 cannot rotate; the wheel members 28 rotate about the axles 26, thereby effectuating driving.

With continued reference to FIG. 3, steering sensor structure and driving sensor structure are included to sense the orientation of the first support structures 16, and the distance travelled by the wheel members 28, respectively. The steering sensor structure includes a steering sensor wheel 70 mounted on the shaft 66, and a steering sensor pickup device 72 mounted in proximity to the steering sensor wheel 70. The sensor wheel 70 and the pickup device 72 are best illustrated in FIG. 4.

The driving sensor structure includes a driving sensor wheel 74 mounted on an axle 76, and a driving sensor pickup device 78 in proximity to the sensor wheel 74.

Figure 4:
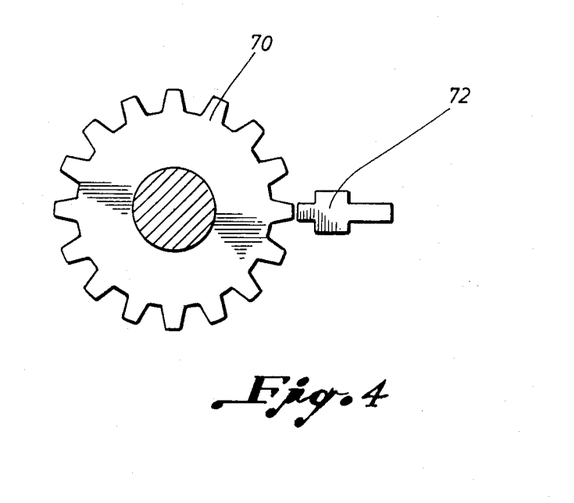
FIG. 4 is a planar view of sensor apparatus used in the platform of FIG. 3.

The sensor wheel 74 and the pickup device 78 are similar to those illustrated in FIG. 4.

A steering tension device 80 and a driving tension device 82 are included to adjust the tension of the belts 64 and 52, respectively. The tension devices 80 and 82 are each spring loaded and are similar in construction to belt tension structures 58 and 68, but they provide different functions. They prevent stalling of the motor due to loading of the lawnmower blade and of the wheel members 28.

The driving tension device 82 varies the speed of rotation of the wheel members 28 by permitting slippage of the belt 52 as a function of lawnmower blade loading caused by the grass being cut. Similarly, steering tension device 80 permits slippage of the belt 64 as a function of resistance to steering imparted to the wheel assemblies 14 by the grass. In the illustrated embodiment, the tension devices 80 and 82 are adjusted so that the engine speed, which is normally approximately 3600 rpm, never falls below 2200 rpm. Tension devices 80 and 82 are especially adapted for use with spring clutches which typically actuate in approximately 20 milliseconds.

Structure is also included to readily indicate the direction in which the platform is heading. A belt 84 couples a gear 86 mounted on the shaft 66 with a gear 88 mounted on a shaft 90. So coupled, the shaft 90 rotates in synchronism with the forks 18 of the first support structures 16.

The shaft 90, which is suitably supported in the frame member 12, contains structure for supporting a direction indicating member such as an arrow, a video camera, a seat, and so forth. The direction indicating member is initially oriented to point in the same direction as the first support structures 16. Thereafter, the direction indicating member turns in synchronism with the first support structures 16.

In applications of the present platform to areas other than lawnmowing, for example robot vacuum cleaning devices that are to be oriented in the direction of platform movement, such as a vacuum cleaning tool head or a seat, may be coupled to the shaft 90. So coupled, the device will be seated in synchronism with the first support structures 16 of the platform 10.

Figures 5, 6:
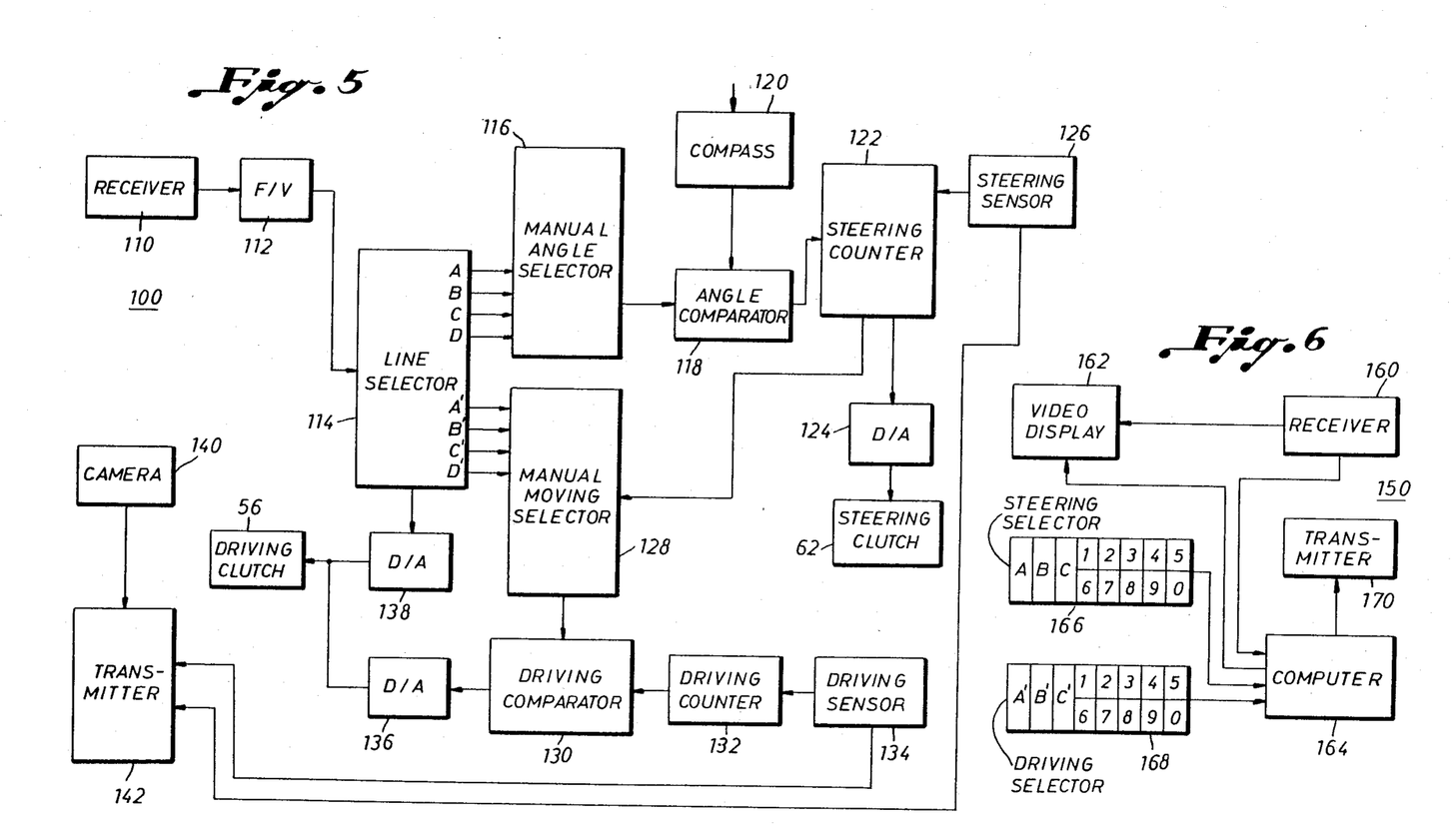
FIG. 5 is a schematic block diagram of control circuitry included on the platform according to the present invention.
FIG. 6 is a schematic block diagram of control circuitry provided at the remote control point according to the present invention.

Referring now to FIG. 5, control circuitry 100 of the platform 10 is illustrated in block diagram form. A receiver 110 receives a signal broadcasted from a remote control point. The output of the receiver 110 is coupled to a frequency to voltage converter 112 which produces an appropriate electrical signal to drive a line selector 114.

The line selector 114 selectively activates steering command lines A, B, C, D and driving command lines A', B', C', D'. Lines A, B, C, D are conductively connected to a manual angle selector 116 which generates an appropriate steering angle signal. The steering angle signal is coupled to an angle comparator 118 which also receives a steering angle error signal from an electronic compass 120. The steering angle error signal represents the difference between the compass heading the platform 10 should be following, and the one it actually is. Such errors can be brought about by terrain features. Correction for such deviations, however, is effectuated in the illustrated embodiment only when a steering angle signal is produced. The steering angle error signal is added to the steering angle signal in the angle comparator 118 and an appropriate signal fed to a steering counter 122.

The steering counter 122 produces an appropriate signal which is fed to a digital-to-analog converter 124. The converter 124 produces an appropriate signal to actuate the steering clutch and brake 62 previously described.

The steering counter 122 receives an input signal from a steering sensor 126 which includes the steering sensor wheel 70 and the steering sensor pickup device 72 previously described.

Lines A', B', C', D' of the line selector 114 are conductively connected to a manual moving selector 128 which produces an appropriate drive signal. The manual moving selector 128 also receives an input signal from the steering counter 122 which is used to coordinate driving and steering of the platform 10. In the present embodiment, the wheel members 28 are not driven when the forks 18 are being steered to a new orientation. Thus, when the signal received by the moving selector 128 from the steering counter 122 indicates that steering is being effectuated, the drive signal produced by moving selector 128 is not coupled to driving comparator 130. The drive signal is coupled to the driving comparator 130, however, when the signal received by the moving selector 128 from the steering counter 122 indicates that a steering operation is not in progress. It will be apparent to those skilled in the art that if it is desired, the wheel members 28 may be driven when the forks 18 are being steered to a new orientation.

The driving comparator 130 further receives an input signal from a driving counter 132 which in turn receives an input signal from a driving sensor 134. The driving sensor 134 includes the driving sensor wheel 74 and the driving sensor pickup device 78 previously described. The driving counter 132 keeps track of the distance travelled by the wheel members 28.

An output signal from the driving comparator 130 is coupled to a digital-to-analog converter 136. An output of the line selector 114 is coupled to a digital-to-analog converter 138. Output signals from the digital-to-analog converters 136 and 138 are used to selectively operate the driving clutch 56 as previously described.

In the embodiment illustrated in FIG. 5, the direction indicating device includes a video camera 140 which is conductively coupled to a transmitter 142. So coupled, data indicative of the scene viewed by the camera 140 is received by the transmitter 142 for broadcasting to a remote control point. Also received by the transmitter 142 are signals from the steering sensor 126 and the driving sensor 134 containing information regarding the orientation of the platform 10 and the distance travelled by the platform 10, respectively. This information is also transmitted to the remote control point.

Referring now to FIG. 6, control circuitry 150 at the remote control point is illustrated in block diagram form. A receiver 160 receives signals broadcasted by the transmitter 142 of the control circuitry 100. The received signals are processed and fed, in part, to a video display device 162 and, in part, to a computer 164. The data displayed on the video device 162 includes the orientation of the platform 10, the elasped distance travelled by the platform 10, and the present steering angular position or bearing of the platform 10.

The computer 164 further receives input signals from a steering selector 166 and a driving selector 168. The steering and driving selectors 166 and 168 are manually adjustable devices which permit the operator to readily select pre-programmed steering angle commands A, B, C, and pre-programmed driving distance commands A', B', C'. Additionally, the selectors 166 and 168 permit numeric selection of values using the digits 0 through 9. Such selection is represented by steering selector command line D and driving selector command line D'.

The computer 164 receives information from the receiver 160, the steering selector 166, and the driving selector 168. It processes this information in accordance with its programmed instructions and provides control signal information to a transmitter 170 for broadcast to the receiver 110 of control circuitry 100.

As will be apparent to those skilled in the art, the control circuitry 150 at the remote control point can readily be incorporated in the control circuitry 100 on the platform 10. In such an embodiment, the camera 140, the video display device 162, the receivers 110 and 160, the frequency to voltage converter 112, and the transmitters 142 and 170 are not needed. Similarly, numerous features of the embodiment described in FIGS. 5 and 6 can be eliminated without detracting from the present invention. For example, the camera 140 and the video display device 162 can readily be eliminated from the drivable, steerable lawnmower of the present invention.

The principals, preferred embodiments and modes of operation of the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention.

What is claimed is:

1. Control apparatus for a drivable, steerable platform having a plurality of wheel members, said control apparatus comprising:
   line selector means having at least one steering command line and at least one driving command line for selectively activating at least one of said command lines;
   manual angle selector means coupled to said at least one steering command line for outputting a steering angle signal;
   compass means for producing a compass signal;
   angle comparator means coupled to said manual angle selector means and to said compass means for receiving said steering angle signal and said compass signal, and for selectively outputting a steering signal;
   steering counter means coupled to said angle comparator means for receiving said steering signal, for outputting a steering counter signal, and for outputting a coordination signal;
   first means coupled to said steering counter means for receiving said steering counter signal and for outputting an output steering signal;
   steering sensor means for sensing the orientation of at least one of said plurality of wheel members, for outputting a wheel orientation signal representative of said orientation, and for coupling said wheel orientation signal to said steering counter means;
   manual moving selector means coupled to said at least one driving command line and to said steering counter means for receiving said coordination signal and for outputting a drive signal;
   driving sensor means for sensing the distance travelled by at least one of said plurality of wheel members and for outputting a distance signal;
   driving counter means coupled to said driving sensor means for receiving said distance signal and for outputting a distance travelled signal representative of the distance travelled by at least one of said plurality of wheel members;
   driving comparator means coupled to said manual moving selector means and to said driving counter means for selectively receiving said drive signal, for receiving said distance travelled signal, and for outputting a driving comparator signal; and
   second means coupled to said driving comparator means for receiving said driving comparator signal and for outputting an output driving signal.

2. The control apparatus according to claim 1 wherein said first and second means each comprise a digital to analog converter means.

3. The control apparatus according to claim 1 further comprising:
   first transmitter means disposed at a first location spaced from said platform for transmitting a transmitted signal;
   first receiver means disposed at a second location coincident with said platform for receiving said transmitted signal, and for outputting a first receiver output signal; and
   coupling means for coupling said first receiver to said line selector means.

4. The control apparatus according to claim 3 wherein said coupling means includes frequency to voltage converter means coupled to said first receiver means for receiving said first receiver output signal, for outputting a converter output signal, and for coupling said converter output signal to said line selector means.

5. The control apparatus according to claim 3 further comprising:
   second transmitter means disposed at said second location and coupled to said driving sensor means and to said steering sensor means for transmitting a data signal; and
   second receiver means disposed at said first location for receiving said data signal and for outputting a second receiver output signal.

6. The control apparatus according to claim 1 further comprising:
   steering selector means for outputting a steering command signal;
   driving selector means for outputting a driving command signal; and
   control means coupled to said steering selector means and to said driving selector means for receiving said steering command signal and said driving command signal, and for outputting a control output signal.

7. The control apparatus of claim 6 wherein said steering selector means, said driving selector means and said control means are each disposed at a first location spaced from said platform, and wherein said control apparatus further comprises:
   first transmitter means disposed at said first location and coupled to said control means for receiving said control output signal and for transmitting a transmitted signal;
   first receiver means disposed at a second location coincident with said platform for receiving said transmitted signal, and for outputting a first receiver output signal;
   first coupling means for coupling said first receiver to said line selector means;

second transmitter means disposed at said second location and coupled to said driving sensor means and to said steering sensor means for transmitting a data signal;

second receiver means disposed at said first location and coupled to said control means for receiving said data signal and for outputting a second receiver output signal; and second coupling means for coupling said second receiver output signal to said control means.

8. The control apparatus according to claim 7 further comprising:
 a video display device disposed at said first location and coupled to said control means and to said second receiver means; and
 a video camera disposed at said second location and coupled to said second transmitter means.

9. The control apparatus according to claim 6 wherein said control means includes a programmable computer.

10. The control apparatus according to claim 9 wherein said steering selector means and said driving selector means each include means for storing and for selecting pre-programmed commands.

11. A drivable, steerable platform having control apparatus, said platform comprising:
 a frame member, said member being generally disposed in a frame member plane;
 at least three wheel assemblies, each of said wheel assemblies including:
 first support structure rotatably connected to said frame member such that said support structure rotates about an axis substantially perpendicular to said frame member plane, said first support structure being endlessly rotatable through an angle of 360°;
 a wheel member rotably mounted on said first support structure such that said wheel member rotates in a wheel rotation plane about an axis substantially parallel to said frame member plane;
 first drive structure to drive said wheel member about its axis of rotation in said wheel rotation plane; and
 first steering structure to rotate said first support structure about its axis of rotation, whereby said wheel member is endlessly steerable through an angle of 360°;
 a first endless device drivingly connected to each of said first drive structures to rotate each of said wheel members substantially in synchronism;
 a second endless device drivingly connected to each of said first steering structures to rotate each of said first support structures substantially in synchronism; and
 drive means for selectively driving said first and second endless devices, said means including:
 a driving device;
 first coupling structure to selectively couple and uncouple said driving device and said first endless device; and
 second coupling structure to selectively couple and uncouple said driving device and said second endless device;
 wherein the wheel rotation planes of said at least three wheel members are disposed substantially parallel to each other; and
 said control apparatus comprising:
 line selector means having at least one steering command line and at least one driving command line for selectively activating at least one of said command lines;
 manual angle selector means coupled to said at least one steering command line for outputting a steering angle signal;
 compass means for producing a compass signal;
 angle comparator means coupled to said manual angle selector means and to said compass means for receiving said steering angle signal and said compass signal, and for selectively outputting a steering signal;
 steering counter means coupled to said angle comparator means for receiving said steering signal, for outputting a steering counter signal, and for outputting a coordination signal;
 first means coupled to said steering counter means for receiving said steering counter signal and for outputting an output steering signal;
 steering sensor means for sensing the orientation of at least one of said wheel assemblies for
 outputting a wheel orientation signal representative of said orientation, and for coupling said wheel orientation signal to said steering counter means;
 manual moving selector means coupled to said at least one driving command line and to said steering counter means for receiving said coordination signal and for outputting a drive signal;
 driving sensor means for sensing the distance traveled by at least one of said wheel members and for outputting a distance signal;
 driving counter means coupled to said driving sensor means for receiving said distance signal and for outputting a distance traveled signal representative of the distance traveled by at least one of said wheel members;
 driving comparator means coupled to said manual moving selector means and to said driving counter means for selectively receiving said drive signal, for receiving said distance traveled signal, and for outputting a driving comparator signal; and
 second means coupled to said driving comparator means for receiving said driving comparator signal and for outputting an output driving signal.

12. The platform according to claim 11 wherein said first and second means of said control apparatus each comprise a digital to analog converter means.

13. The platform according to claim 11 wherein said control apparatus further comprises:
 first transmitter means disposed at first location spaced from said platform for transmitting a transmitted signal;
 first receiver means disposed at a second location coincident with said platform for receiving said transmitted signal, and for outputting a first receiver output signal; and
 coupling means for coupling said first receiver to said line selector means.

14. The platform according to claim 13 wherein said coupling means of said control apparatus includes frequency to voltage converter means coupled to said first receiver means for receiving said first receiver output signal, for outputting a converter output signal, and for coupling said converter output signal to said line selector means.

15. The platform according to claim 13 wherein said control apparatus further comprises:

second transmitter means disposed at said second location and coupled to said driving sensor means and to said steering sensor means for transmitting a data signal; and second receiver means disposed at said first location for receiving said data signal and for outputting a second receiver output signal.

16. The platform according to claim 11 wherein said control apparatus further comprises:

steering selector means for outputting a steering command signal;

driving selector means for outputting a driving command signal; and control means coupled to said steering selector means and to said driving selector means for receiving said steering command signal and said driving command signal, and for outputting a control output signal.

17. The platform according to claim 16 wherein said steering selector means, said driving selector means and said control means of said control apparatus are each disposed at a first location spaced from said platform, and wherein said control apparatus further comprises:

first transmitter means disposed at said first location and coupled to said control means for receiving said control output signal and for transmitting a transmitted signal;

first receiver means disposed at a second location coincident with said platform for receiving said transmitted signal, and for outputting a first receiver output signal;

first coupling means for coupling said first receiver to said line selector means;

second transmitter means disposed at said second location and coupled to said driving sensor means and to said steering sensor means for transmitting a data signal;

second receiver means disposed at said first location and coupled to said control means for receiving said data signal and for outputting a second receiver output signal; and second coupling means for coupling said second receiver output signal to said control means.

18. The platform according to claim 17 wherein said control apparatus further comprises:

a video display device disposed at said first location and coupled to said control means and to said second receiver means; and a video camera disposed at said second location and coupled to said second transmitter means.

19. The platform according to claim 16 wherein said control means of said control apparatus includes a programmable computer.

20. The platform according to claim 19 wherein said steering selector means and said driving selector means of said control apparatus each include means for storing and for selecting preprogrammed commands.

* * * * *